(12) United States Patent
Badrinarayanan et al.

(10) Patent No.: US 10,496,291 B2
(45) Date of Patent: Dec. 3, 2019

(54) MAINTAINING DATA INTEGRITY DURING DATA MIGRATION

(71) Applicant: SAP SE, Walldorf (DE)

(72) Inventors: Narasimhan Badrinarayanan, Bangalore (IN); Srinath Krishnan, Bangalore (IN); Kannan Andireddi, Bangalore (IN)

(73) Assignee: SAP SE, Walldorf (DE)

( * ) Notice: Subject to any disclaimer, the term of this patent is extended or adjusted under 35 U.S.C. 154(b) by 504 days.

(21) Appl. No.: 14/974,046

(22) Filed: Dec. 18, 2015

(65) Prior Publication Data

US 2017/0177649 A1 Jun. 22, 2017

(51) Int. Cl.
*G06F 3/06* (2006.01)
*G06F 21/64* (2013.01)

(52) U.S. Cl.
CPC ............ *G06F 3/0617* (2013.01); *G06F 3/067* (2013.01); *G06F 3/0619* (2013.01); *G06F 3/0647* (2013.01); *G06F 21/64* (2013.01)

(58) Field of Classification Search
USPC ................ 707/609, 687, 705, 790, 813, 821
See application file for complete search history.

(56) References Cited

U.S. PATENT DOCUMENTS

| 7,248,891 B2 | 7/2007 | Charles et al. |
| 8,089,899 B2 | 1/2012 | Lund et al. |
| 2012/0096389 A1* | 4/2012 | Flam ..................... G06F 16/168 715/777 |
| 2014/0196038 A1* | 7/2014 | Kottomtharayil ....... G06F 9/505 718/1 |
| 2014/0196056 A1* | 7/2014 | Kottomtharayil ....... G06F 9/505 718/105 |
| 2016/0371153 A1* | 12/2016 | Dornemann ........ G06F 11/1458 |

FOREIGN PATENT DOCUMENTS

WO 2014063240 A1 5/2014

* cited by examiner

*Primary Examiner* — Sana A Al-Hashemi
(74) *Attorney, Agent, or Firm* — Fish & Richardson P.C.

(57) ABSTRACT

Various embodiments of systems and methods for maintaining data integrity during data migration are described herein. The systems and methods describe a data migration application that may be installed and executed on a computer device. The data migration application may be connected with multiple data systems via computer network. An authorized user may access the data migration application to migrate data between data systems such as from data source systems to destination systems. In case there is loss of data due to data system interruption, e.g. if a server is abruptly stopped, or software upgrade occurs, the data migration application may create backup data of the failed data migration. The data migration application may reinitiate the data migration to restore the data into the destination system.

17 Claims, 11 Drawing Sheets

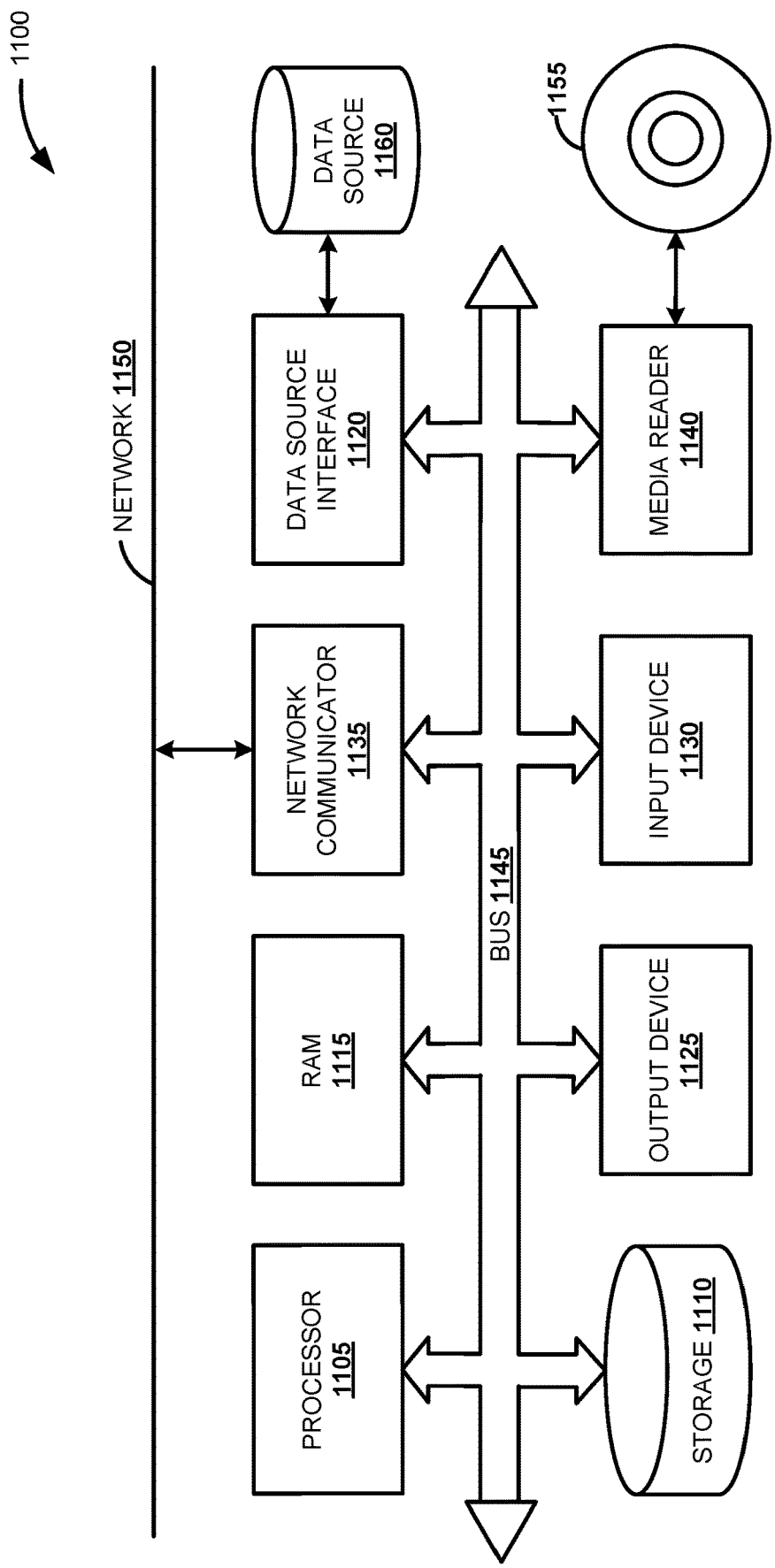

MAINTAINING DATA INTEGRITY DURING DATA MIGRATION

FIELD

The disclosed embodiments generally relate to software program development tools and techniques, including processes and apparatuses for migrating data from one computer system to another computer system.

BACKGROUND

Computer applications such as enterprise systems execute business processes and generate large amount of reports or processed data on daily basis. To store this processed data generated on regular basis into a memory associated with the enterprise systems involve high risk for loss of data. For example, loss of data or data integrity due to system crash during data migration. In addition, enterprise systems may be easily intercepted. This may provide unauthorized access to the stored data that may result in loss of data or corrupt data. Considering the above issues, data from the enterprise systems is transferred or migrated to secure storage systems or database systems. These database systems are protected by advanced security measures to protect data from unauthorized access. However, maintaining data integrity is a challenge when exchanging or transferring large amount of data between computer systems or storage systems or computer applications in real time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 11 is a block diagram illustrating a computing environment to maintain data integrity during data migration from one computer system to another computer system, according to one embodiment.

DETAILED DESCRIPTION

Embodiments of techniques for maintaining data integrity during data migration are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Data may be migrated or transferred between computer systems, storage systems or computer applications. Computer systems may, for example, be servers and storage systems may be databases or repositories. Data migration may be commenced to replace or upgrade servers or databases, for server maintenance or to relocate data to different databases, etc. In another embodiment, data migration secures business data by ensuring data integrity and thereby minimize data loss at a data source system, e.g. source enterprise application or enterprise systems.

Transferring or migrating data from one computer system to another computer system includes database operations such as extract, transform and load (ETL) operation. ETL may be a three step process, in the first step data is extracted from various data source systems, e.g. servers. Second, the extracted data is cleansed and transformed that may be used for executing any business process. Third, the cleansed and transformed data is loaded into target database systems or storage systems or other data source systems. In one embodiment, the loaded data may include information pertaining to particular data formats that would assist in data retrieval process. A collection of target database systems may act as a data warehouse. In one embodiment, in reference to ETL process, the process of data migration may require extract and load steps for its completion. Maintaining data integrity is very crucial when migrating data from data source systems, for example, if the server is interrupted, stopped abruptly, and/or server failure. Also, data source systems may not be deployed with auto backup mechanism. The proposed solution for data migration helps in addressing the above issues.

Figure 1:
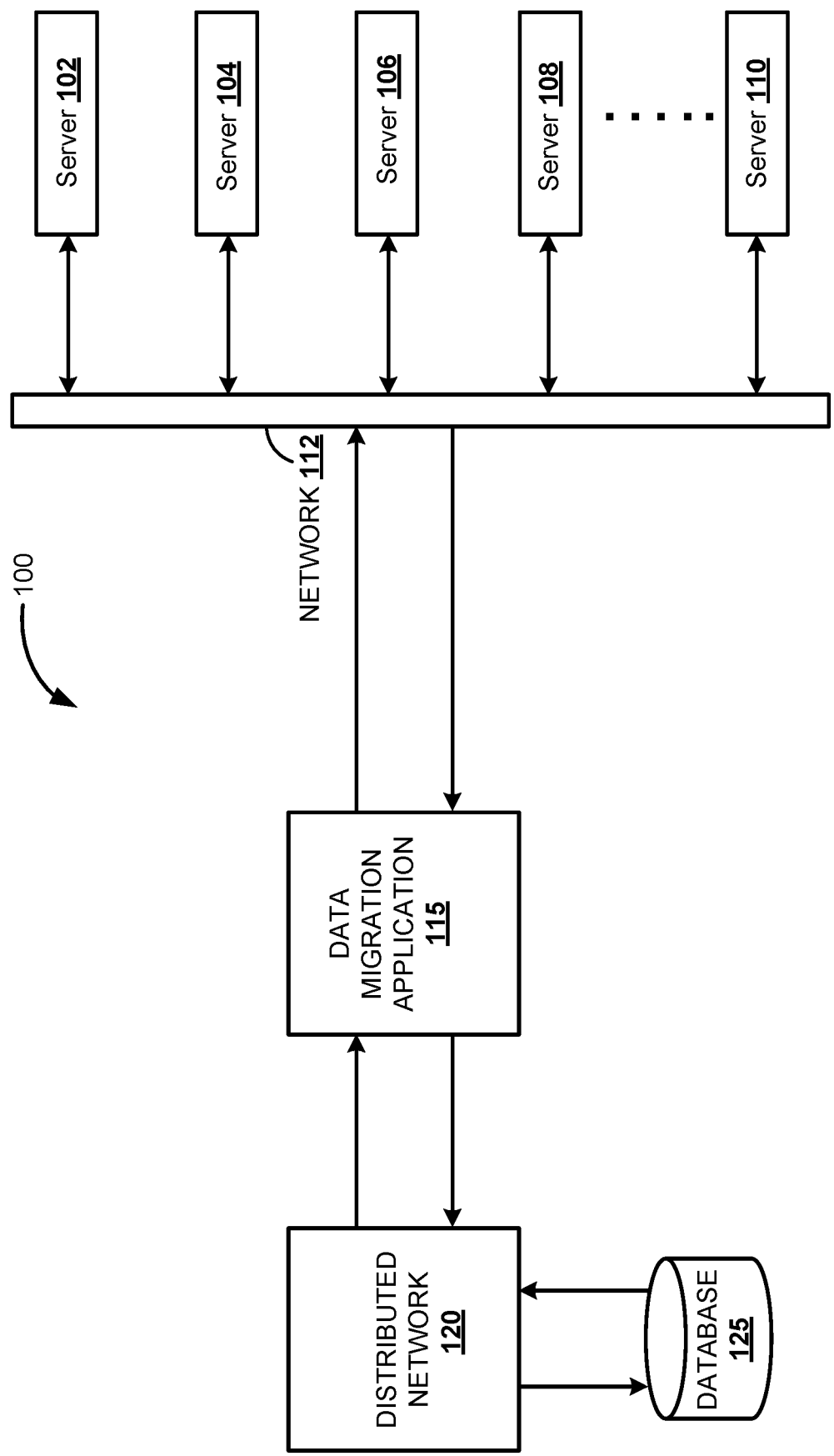
FIG. 1 is a block diagram of a system for maintaining data integrity during data migration, according to one embodiment.

FIG. 1 shows a block diagram of a system 100 for maintaining data integrity during data migration, according to one embodiment. The system 100 may include multiple data source systems such as servers (102, 104, 106, 108, and 110). These servers (102, 104, 106, 108, and 110) may connect with the data migration application 115 as shown in the FIG. 1 via a computer network 112, e.g., wide area network (WAN), cellular network, local area network (LAN), metropolitan area network (MAN), near field network (NFC), WI-FI, WI-MAX, cellular network etc. or a combination of networks. In one embodiment, the computer network 112 may be deployed with firewall systems, to provide secure access to third parties when migrating data from one computer system to another computer system or storage system.

In one embodiment, the data migration application 115 may be deployed in a distributed network 120. Authorized users may connect with distributed network 120 remotely to access the data migration application 115. In another embodiment, a first part of the data migration application 115 may be deployed on the distributed network 120 that stores the business logic, data backup rules, data recovery rules, and application execution rules etc. Additionally, a second part of the data migration application 115 may be installed in any computer devices such as laptops, tablets, handheld computer devices, etc. The second part of the data migration application installed in the computer devices, accessible to authorized users.

The data migration application 115 may communicate with the distributed network 120 to receive the business logic for data migration, data backup, or data recovery etc. as and when required via the computer network. The distributed network may be connected with one or more databases. The data migration application receives information related to data to be migrated from the servers (102, 104, 106, 108, and 110). The servers (102, 104, 106, 108, and 110) may act as data source systems or destination systems and vice versa. For example, data from the server 102 is migrated to server 108, here server 102 acts as a data source system and server 108 acts as a destination system. The distributed network 120 may be connected with the database 125 to store the migrated data or backup/archived data of the servers (102, 104, 106, 108, and 110). The distributed network 120 may be connected with multiple databases similar to database 125 that acts as a data warehouse.

In one embodiment, the data migration application 115 may be accessed by authorized user such as administrator or sub administrator or any user authorized by the administrator(s). An instances of the servers (102, 104, 106, 108, and 110) along with data migration information are received at the data migration application 115. The administrator may execute data migration commands or instructions to migrate data from the servers (102, 104, 106, 108, and 110) to the database 125. The distributed network 120, upon receiving authorized user commands for data migration, pushes the received data from the servers (102, 104, 106, 108, and 110) to the database 125. The data migration application 115 may be integrated with any computer applications such as enterprise systems for facilitating data migration and ensuring data integrity upon data migration. Data migration application 115 may support multiple layers of data migration, e.g., one to one, one to many, many to one and many to many or combination thereof.

Figure 2:
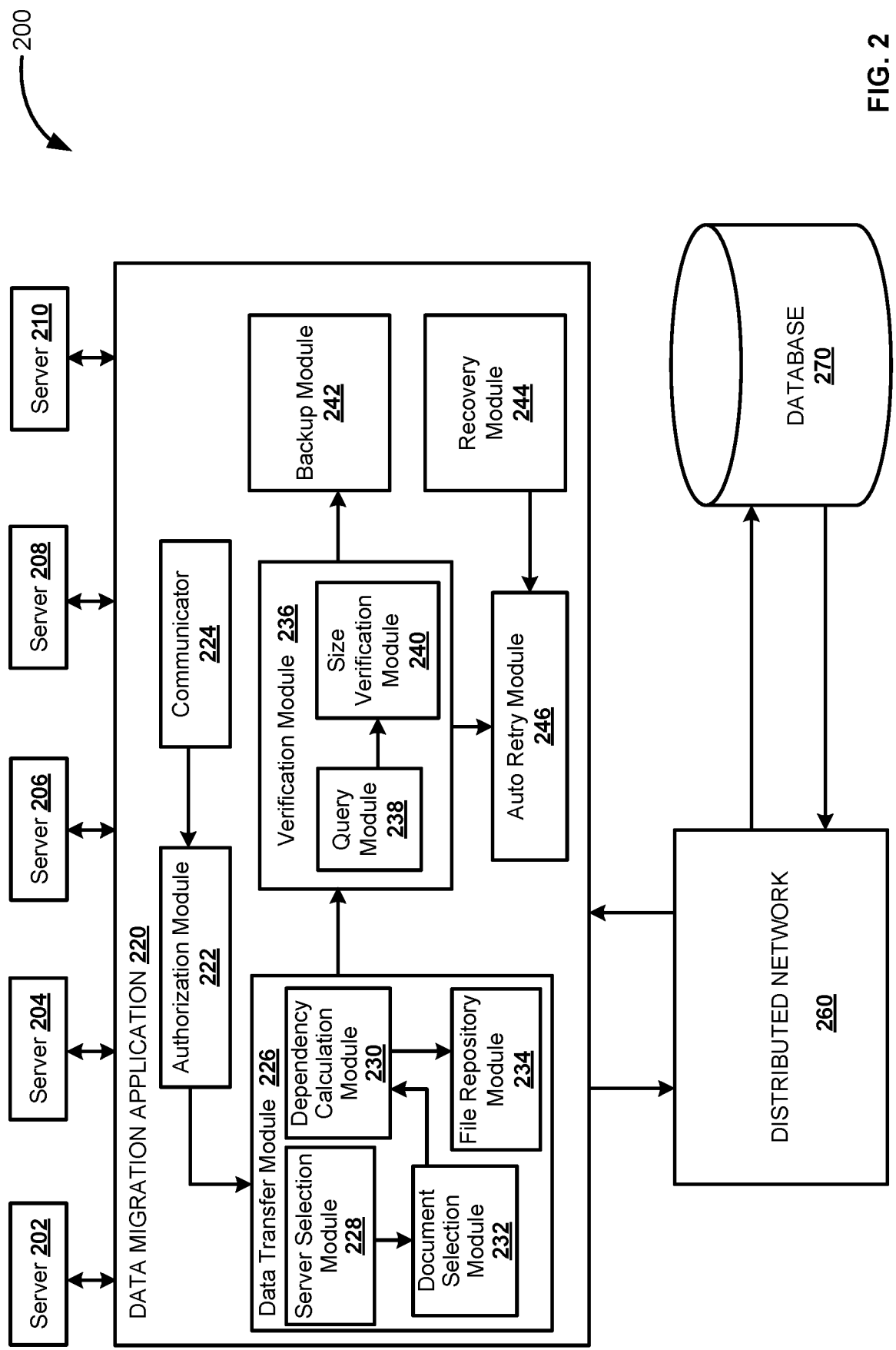
FIG. 2 is a block diagram of a system for maintaining data integrity during data migration, according to one embodiment.

FIG. 2 illustrates a block diagrams of a system 200 for maintaining data integrity during data migration, according to one embodiment. The system 200 may include multiple data source systems such as servers (202, 204, 206, 208, and 210). These servers (202, 204, 206, 208, and 210) may connect with the data migration application 220 via a computer network 212. In one embodiment, the data migration application 220 may be deployed in a distributed network 260. In another embodiment, a first part of the data migration application 220 may be deployed on the distributed network 225 that stores the business logic, data backup rules, data recovery rules, and application execution rules etc. and a second part of the data migration application 220 may be installed in computer devices, such as laptops, tablets, handheld computer devices, etc., which may be accessed by the authorized users. The distributed network 260 may be connected with the database 270 to store the migrated data from the servers (202, 204, 206, 208, and 210). Also, the data migration application 220 may recover data from the database 270 connected with the distributed network 260 as and when required by the user. In one embodiment, the distributed network 220 may include micro services that are independent, modular, autonomous, self-contained services implemented with service-oriented architecture. For example, these micro services may be a determinator that determines dependencies for a selected document or a generator that generates dependency map for the selected document. In one embodiment, the data migration application 220 may utilize micro services offered by the distributed network 260 for its execution. For example, the distributed network 260 may be SAP HANA® Cloud Platform (HCP) micro services provided by SAP® SE. In one embodiment, the servers (202, 204, 206, 208, and 210) are registered with the data migration application 220. In an exemplary example, the servers (202, 206 and 208) may act as data source systems and servers (204 and 210) as destination systems. Data migration takes place between the data source systems and the destination systems.

In one embodiment, the data migration application 220 may include but is not limited to authorization module 222, communicator 224, data transfer module 226, verification module 236, backup module 242, recovery module 244 and auto-retry module 246. The communicator 224 may be used for the communication and data exchange, e.g. to receive data migration information from the servers (202, 204, 206, 208, and 210). The communicator 224 receives information pertaining to data to be migrated from the data source systems, e.g. servers (202, 206 and 208) to the destination systems, e.g. servers (204 and 210). The communicator 224 communicates the received information to the authorization module 222. The authorization module 222 checks whether the data migration application 220 is authorized to receive information from a particular data source system, e.g. server 202. Upon successful authorization of the received information, the authorization module 222 sends and/or updates the data transfer module 226. In one embodiment, the data transfer module 226 may be a user interface that facilitates authorized user to view information and provide appropriate instructions for data migration.

The data transfer module 226 may include server selection module 228, document selection module 232, dependency calculation module 230, and file repository module 234. The authorized user may access the server selection module 228 to select multiple data source systems and multiple destination systems. For example, the data source systems selected by the authorized user may be servers (202, 206 and 208) from where data needs to be migrated to multiple destination systems, e.g. servers (204 and 210). In an exemplary example, the destination systems may also include other databases, e.g. database 270 and servers that are registered with the data migration application 220. Once, the selection of servers (202, 206 and 208) is complete, the authorized user may access the selected servers (202, 206 and 208) individually to select the documents to be migrated. The authorized user may schedule the data migration from the data source systems, e.g. servers (202, 206 and 208). In one embodiment, the selection of the documents from the data source systems, e.g. servers (202, 206 and 208) may be manual or automatic as set by the authorized user.

In one embodiment, the document selection module 232 may facilitate user selection of multiple documents, from a data source system, e.g. server 202, which are to be migrated. In another embodiment, the document selection module 232 may facilitate automatic selection of documents from the data source system, e.g. server 202. The dependency calculation module 230 may receive information pertaining to selected servers (202, 206 and 208) and selected documents from the document selection module 232. The dependency calculation module 230 may also receive the information pertaining to destination systems from the server selection module 228. The dependency calculation module 230 may determine and generate dependency information pertaining to a selected document, e.g. a crystal report related to production, from the selected server 202. The dependency information may include dependencies of the selected document on other documents, e.g. the production report may also depend on pre-production reports such as contract reports or tender assignment reports and also on post-production reports such as sales and revenue reports. Additionally, the dependency information may also include dependencies of the selected document on data objects related to other documents, computer programs or universes. For example, the universe may be a semantic layer of a computing environment. The dependency calculation module 230 also determines the users and user roles that are enabled to read and/or write operation on the selected documents for data migration. In one embodiment, the determined dependencies execute instructions associated with the selected documents at the destination systems. Once the dependencies are determined related to the selected documents from the data source systems, e.g. severs (202, 206 and 208) are determined, the dependency calculation module 230 may generate a dependency map. The generated dependency map may be pertinent to each selected document from the data source system. In one embodiment, the generated dependency map represents relationships of the determined dependencies with the selected document.

The file repository module 234 may receive the dependency information, dependency maps generated for the selected documents and information pertaining to data source systems, e.g. severs (202, 206 and 208) from the dependency calculation module 230. The file repository module 234 may initiate the process of data migration from the data source system, e.g. severs (202, 206 and 208) to the destination systems, e.g. servers (204 and 210). For example, this is accomplished by transferring the selected documents along with the respective dependency maps to the servers (204 and 210). In one embodiment, instances of the selected documents to be migrated from various data source systems, e.g. servers (202, 206 and 208), are uploaded on the file repository module 234. In an exemplary example, the file repository module 234 may use file transfer protocol (FTP) along with transmission control protocol (TCP) or TCP/IP for transferring data from the data source systems, e.g. servers (202, 206 and 208) to the destination systems, e.g. servers (204 and 210). In one embodiment, the dependency map maintains integrity of the corresponding data during data migrations from the data source systems to the destination systems.

In one embodiment, once the data migration process is complete, the verification module 236 may verify the migrated data, e.g. selected documents and respective dependency maps from the data source systems, e.g. servers (202, 206 and 208). The verification module 236 verifies whether each of the selected documents and respective dependency maps are completely migrated to the destination systems, e.g. servers (204 and 210). The verification module 236 may include query module 238 and size verification module 240. The query module 238 may receive the selected documents along with the respective dependency maps from the data transfer module 226. The query module 238 may identify the unique identification numbers of selected documents received from the data transfer module 226. The query module 238 may construct queries with the unique identification numbers of selected documents. These queries may be written in a query language such as structured query language (SQL). In one embodiment, the query module 238 may execute the constructed queries at the destination systems, e.g. servers (204 and 210). In another embodiment, the query module 238 may also execute the constructed queries at the destination systems, e.g. servers (204 and 210) periodically during the data migration process. In one embodiment, if the data migration process pertaining to a particular selected document is unsuccessful or data migration failure occurs, then the query module 238 may communicate with the auto retry module 246. The auto retry module 246 reinitiates the data migration from the data source systems to the destination systems, once the status of failed data system is running.

In another embodiment, if the data migration process pertaining to a particular selected document is successful, the query module 238 may communicate with the size verification module 240 with information pertaining to the selected documents to be migrated, e.g. unique identification numbers of the selected documents, files sizes of the selected documents, data source systems such as servers (202, 206 and 208), destination systems such as servers (204 and 210), etc. The size verification module 240 may verify file sizes of the migrated documents at the destination systems, e.g. servers (204 and 210). This is accomplished by comparing the file size of the selected documents at the data source systems, e.g. servers (202, 206 and 208) and the file size of the migrated documents at the destination systems, e.g. servers (204 and 210). Upon successful verification of the file size at the data source systems and the destination systems, a success acknowledgement message is sent to the respective data source systems. For example, if the production report along with its dependency map are successfully migrated to the server 204, a success acknowledgement message is sent to the server 202. Upon unsuccessful verification of the file size at the data source systems and the destination systems, the size verification module 240 may communicate with the auto retry module 246.

In one embodiment, the auto retry module 246 may quarantine the unsuccessful data migration of the selected document(s) from the data sources systems to the destination system. The document(s) quarantined may include information such as unique identification number, dependency map, data sources system, destination system, etc. The auto retry module 246 may check whether the destination systems, e.g. server 204 is active or running, corresponding to a particular quarantined document, e.g. sales report from the data source system, e.g. server 208. If yes, the auto retry module 246 may automatically initiate the data migration process for the quarantined document, e.g. sales report from the data source system, e.g. server 208 to the destination system, e.g. server 204. If no, the auto retry module 246 periodically checks whether the destination system(s), e.g. server 204 is active or running corresponding to the quarantined documents. The auto retry module 246 may monitor end-to-end data migration of the quarantined documents from the data source systems to the destination systems. This is to ensure that all the quarantined documents successfully migrated from the data source systems to the destination systems. The auto retry module 246 may assists in data migration of large amount of data from the data source systems to the destination systems without any user interventions.

In one embodiment, the backup module 242 may create backup of the documents from the data source systems and destination systems, e.g. servers (202, 204, 206, 208 and 210). This is done by archiving and storing the documents into the database 270. The backup module 242 collects information pertaining to documents and respective dependency maps from the data transfer module 226, verification module 236 and auto retry module 246. The backup module 242 may create versions of the documents with respect to time stamps. Further, backup module 242 may archive and store all the versions of the documents into the database 270 using the distributed network 260. The backup module 242 may also store information, e.g. metadata, related to the data source systems and destination systems of the archived documents. In one embodiment, the recovery module 244 may recover the archived documents from the database 260. The recovery module 244 may receive a selection of archived document(s) as a user selection or a request from the auto retry module 246. Based on the selection of archived documents received, the recovery module 244 may recover the archived version of the document(s) from the database 270 for a particular data source system or a particular destination system, e.g. server 204. In one embodiment, when issues such as system crash or data corruption etc. are encountered, the backup module 242 and the recovery module 246 may function in combination. The backup module 242 may create backup of the affected documents that were migrated from the data source system to the destination system. The backup of the affected documents are archived and stored into the database 270. The recovery module 244 may recover the archived documents from the database 270 and restore them to their respective data source systems, e.g. servers (202, 206 and 208).

In one embodiment, the data migration application 220 may also include source/destination module and share module. The source/destination module may assist the authorized user to register new data source systems and/or destination systems and vice versa. In addition, the authorized user may remove or edit information pertaining to the registered data source systems and/or destination systems. The source/destination module periodically obtains metadata information from registered data source systems and/or destination systems such as status, internet protocol (IP) address, storage capacity, and etc. In one embodiment, the share module of the data migration application 220 may assist the authorized user to share documents. For example, server 202 may be accessed by the authorized user, e.g. user-1. The user-1 may select and share multiple documents by uploading them on the data migration application 220 by accessing the upload option. The user-1 may also define users and user roles authorized to view or download the shared documents from the data migration application. The shared documents uploaded on the data migration application 220 are authenticated and stored in the database 270. Authorized users enabled to view or download the shared documents, may access the database 270. The authorized users may also download and load the shared one or more documents in any registered data source systems or destination systems based on granted permissions.

Figure 3:
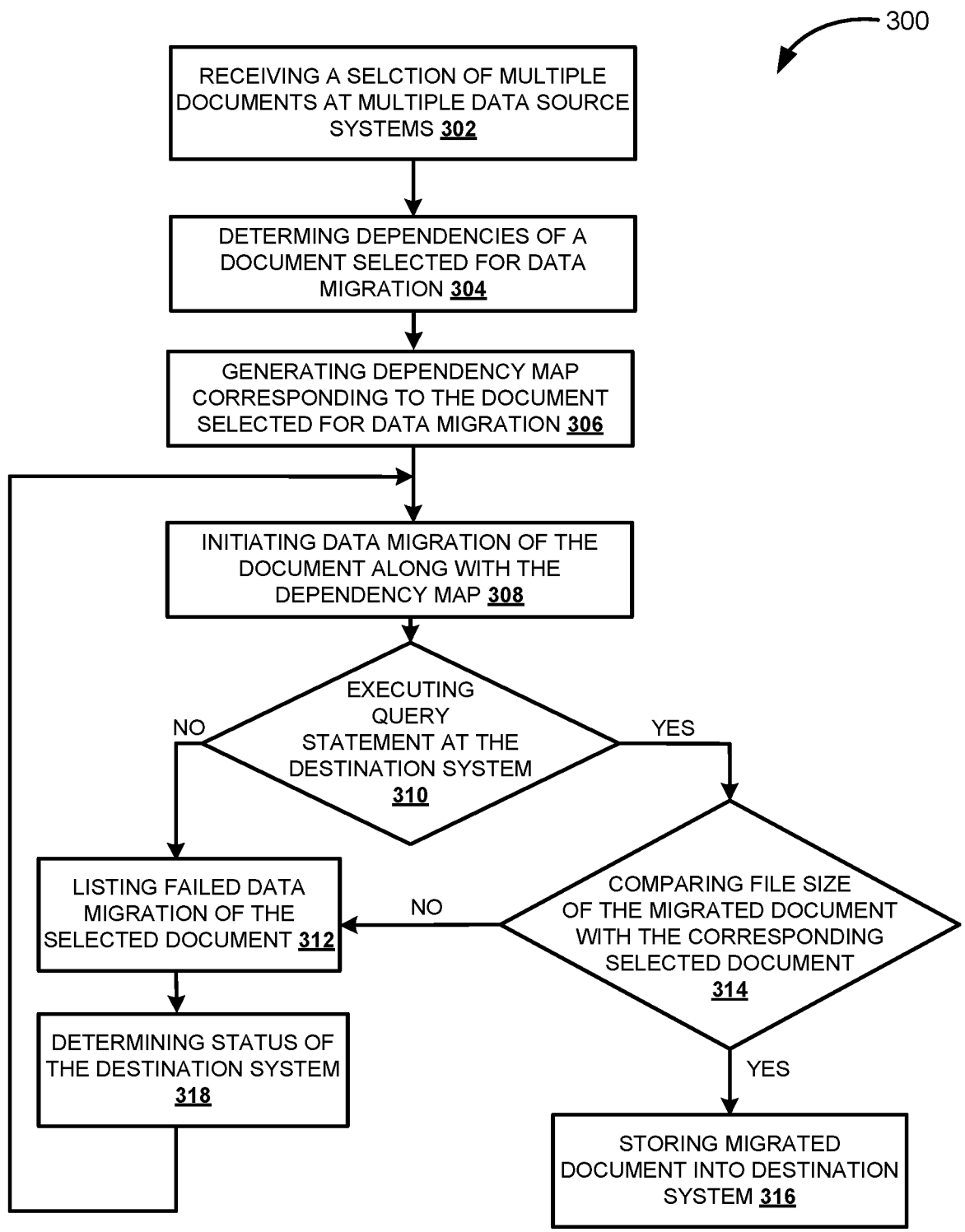
FIG. 3 is a flow chart illustrating a process for maintaining data integrity during data migration, according to an exemplary embodiment.

FIG. 3 is a flow diagram illustrating a process 300 for maintaining data integrity during data migration, according to an exemplary embodiment. A data migration application may be installed on a computer device, e.g. a mobile device and connected with a distributed network. An authorized user, e.g. an administrator may access the data migration application installed on the computer device. The administrator may register multiple data systems, e.g. servers that may act as data source systems and/or destination systems. The process 300 is executed by the data migration application to verify and maintain data integrity, e.g. organizational reports, migrated/transferred from the data source system, e.g. 'Production Server' to the destination system, e.g. 'Analytical Server'.

At block 302, a selection of multiple documents, e.g. 'Production Reports' and 'R & D Reports' from multiple data source systems, e.g. 'Production Server' and 'R & D Server' from the administrator, are received. In one embodiment, the administrator may first select one or more data source systems registered with the data migration application. In another embodiment, selection of multiple documents from the multiple data source systems may be automatic as set or scheduled by the administrator. Next the administrator may select multiple destination systems registered with the data migration application. Upon accessing a selected data source system, e.g. 'Production Server', the data migration application renders associated documents required to be migrated to destination system, e.g. 'Analysis Server'. The administrator may confirm selection of the documents at the data source systems, e.g. 'Production Reports' and 'R & D Reports' for initiating the data migration process on the data migration application.

Next at 304, upon receiving confirmation of the selected documents from the administrator, determining dependencies of a document, e.g. 'Production Report' selected for data migration from the data source system, e.g. 'Production Server'. For example, the 'Production Report' may be dependent on data objects, e.g. 'Quarterly Production' or other documents, e.g. 'Employees Report' or 'Sales Report'. The 'Employee Report' may be stored in different data source system, e.g. 'Employee Server' and the 'Sales Report' may be stored in the same data source system, e.g. 'Production Server'. The 'Production Report' may be dependent on universe, e.g. semantic layer, of the computing environment. For example, crystal reports may depend on the universe. In one embodiment, dependencies execute instructions associated with the document, e.g. 'Production Report' at destination system, e.g. 'Analysis Server', after successful completion of data migration.

At 306, dependency map are generated corresponding to the document, e.g. 'Production Report' selected for data migration from the data source system, e.g. 'Production Server'. The data migration application generates the dependency map based on the determined dependencies, e.g. data objects 'Quarterly Production', other documents 'Employee Report', 'Sales Report' and universe, in the previous step 304. Based on the generated dependency map, the data migration application may fetch instances of the dependencies such as data objects, other documents, computer programs and universe from the same or different data source systems. In one embodiment, the dependency map represent relationships of the dependencies with the document, e.g. 'Production Report' to be migrated.

Next at 308, once the dependency map is generated, the data migration of the selected document is initiated along with the dependency map from the data source system, e.g. 'Production Server', to the destination system, e.g. 'Analysis Server'. At block 310, query statements may be executed at the destination system, e.g. 'Analysis Server' periodically during data migration and/or after completion of data migration. The query statements include identification number of the documents to be migrated. The query statements are executed at the destination system to verify the data migration. This is accomplished by matching the identification number of the migrated document, e.g. 'Production Report' at the destination system, e.g. 'Analysis Server' with the corresponding selected document, e.g. 'Production Report' from the data source document, e.g. 'Production Server'. The query statements may be written in structured query language (SQL).

At 312, failed data migration of the selected document is listed if the execution of the query statements at the destination system, e.g. 'Analysis Server' is unsuccessful, at block 310. This may suggest that the identification number of the migrated document, e.g. 'Production Report' at the destination system, e.g. 'Analysis Server' did not match with the corresponding selected document, e.g. 'Production Report', from the data source system, e.g. 'Production Server'. In one embodiment, the selected document, e.g. 'Production Report' may not be migrated to the destination system, e.g. 'Analysis Server' from the data source system, e.g. 'Production Server'. This may occur due to issues such as network failure or server down etc. Next at 318, the status of the destination system, e.g. 'Analysis Server' is determined periodically or in non-regular time intervals. If the status of the destination system, e.g. 'Analysis Server' determined to be 'running' or 'active' then the data migration of the selected documents is initiated again, at step 308. In one embodiment, at block 312, listing the failed data migration also includes creating backup of the selected documents from the data source systems. For example, if data migration of the 'Production Report' from the 'Production Server' fails, the data migration application automatically creates backup of the 'Production Report' along with time stamps. The backup of the selected documents may be archived and stored into a storage/database system accessible by the data migration application. This storage/database system may be connected via the computer network. When, at step 318, if the destination system, e.g. 'Analysis Server' is determined to be 'running', the data migration application may first recover the archived 'Production Report' from the storage/database system accessible by the data migration application. Next, the data migration application may restore the 'Production Report' at the destination system, e.g. 'Analysis Server' by initiating the data migration, at step 308.

At block 314, upon successful matching of the identification numbers of the selected documents from the data source system, file size of the migrated document is compared with the file size of the selected at the destination system. If the execution of the query statements at the destination system, e.g. 'Analysis Server' is successful, at block 310. For example, comparing the file size of the migrated document, e.g. 'Production Report' at the destination system, e.g. 'Analysis Server' with the corresponding selected document, e.g. 'Production Report' from the data source system, e.g. 'Production Server'. The data migration application checks whether the selected document, e.g. 'Production Report' from the data source system, e.g. 'Production Server' that is migrated to the destination system, e.g. 'Analysis Server' in entirety by comparing the file size. In one embodiment, when the comparing result is unsuccessful that is file size of the migrated document at the destination system is not same or unequal to the file size of the selected document at the data source system. This may be termed as failed data migration. Listing failed data migration of the selected document, e.g. 'Production Report', at block 312.

In another embodiment, when the comparing result is successful that is file size of the migrated document at the destination system is same or equal to file size of the selected document at the data source system. The migrated document, e.g. 'Production Report' is stored into the destination system, e.g. 'Analysis Server', at block 316.

Figure 4:
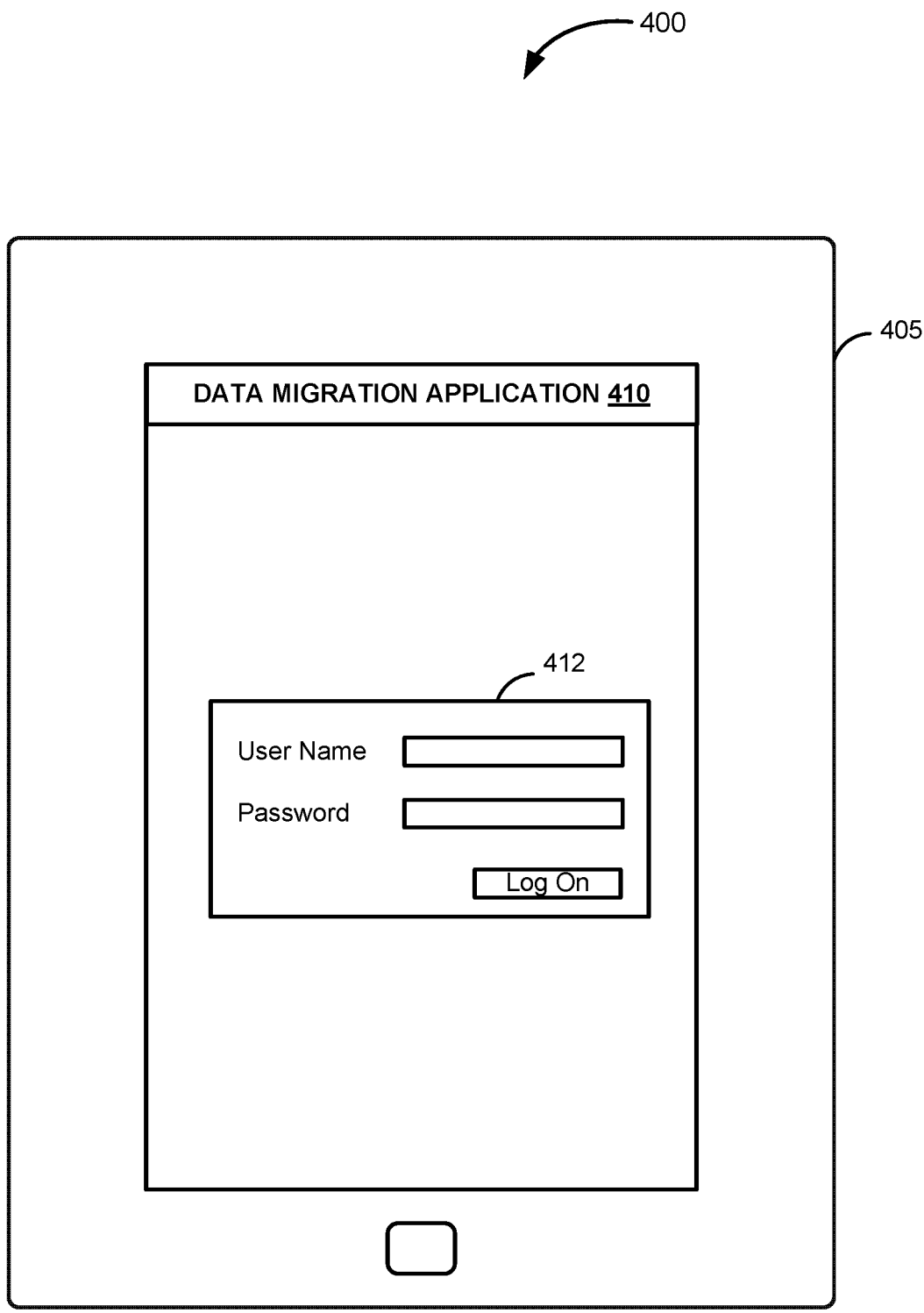
FIG. 4 illustrates an exemplary graphical user interface of a data migration application, according to an exemplary embodiment.

FIG. 4 illustrates a graphical user interface 400 of a data migration application 410, according to an exemplary embodiment. The data migration application 410 is installed in a computer device 405, for example, a tablet PC or a handheld device. The graphical user interface 400 illustrates a login area 412. An authorized user, e.g. administrator may login into the data migration application 410 by providing user credential in the login area 412. The login area 412 may request for user credentials such as username and password as shown in FIG. 4. After providing the user credentials, the administrator may access/click on 'Log On' button to gain access to the data migration application 410.

Figure 5:
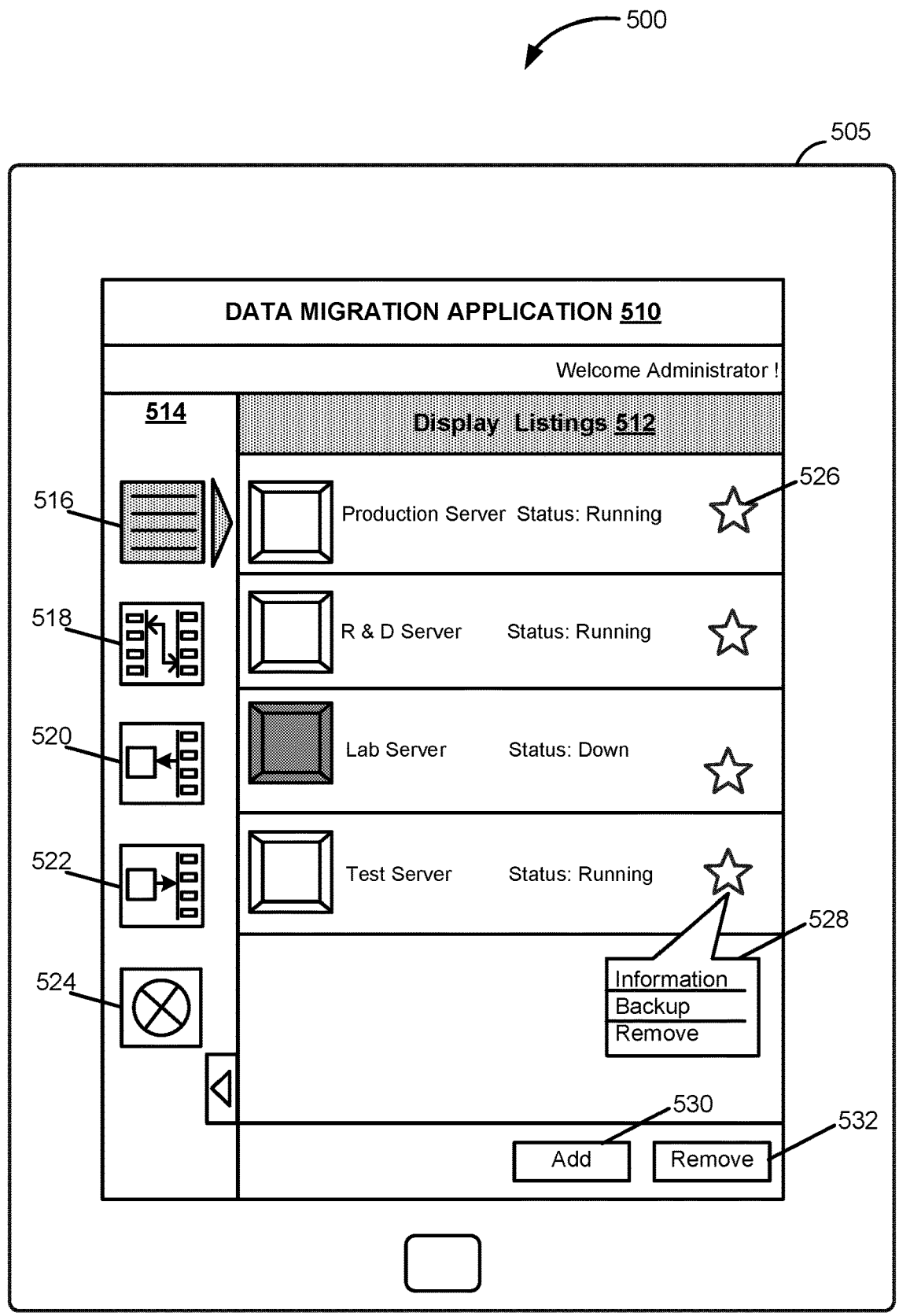
FIG. 5 illustrates an exemplary graphical user interface of a data migration application, according to an exemplary embodiment.

FIG. 5 illustrates a graphical user interface 500 of a data migration application 510, according to an exemplary embodiment. The data migration application 510 may be installed in a computer device 505, for example, an iPad or a mobile device etc. The data migration application 510 displays left column 514 that includes functionality buttons such as data system listings button 516, data migration button 518, backup button 520, recovery button 522 and failed data migration button 524. An authorized user may have granted permissions to access the aforementioned functionality buttons (516, 518, 520, 522, and 524). In FIG. 5, the data system listings button 516 is shaded to indicate user selection. When the data system listings button 516 is selected, data systems registered with the data migration application 510 are presented under display listings 512 area. The data systems displayed may include registered data source systems and registered destination systems. Data systems, for example: 'Production Server', 'R & D Server', 'Lab Server' and 'Test Server' are shown under the display listings 512 area. Each of the data systems are listed in the display listings 512 are provided with a star button 526. For example, the authorized user may access the star button 526 corresponding to 'Production Server' to view and select options 528 such as 'Information', 'Backup' and 'Remove'. If the authorized user selects 'Information' then the data migration application 510 may display metadata information corresponding to the data system, e.g. 'Production Server'. If the authorized user selects 'Backup' then the data migration application 510 may create backup of the data corresponding data system, e.g. 'Production Server' and store into a database. This database may be accessible by data migration application 510 via secure computer network. If the authorized user selects 'Remove' then the data system, e.g. 'Production Server' may be removed from the list of registered data systems. In the data migration application 510 may also display status of the registered data systems in the display listings 512 area. For example, status of the 'Production Server', 'R & D Server' and 'Test Server' is 'running' while the status of the 'Lab Server' is 'down'. Status 'running' indicates that the corresponding data system active at that time. Status 'down' indicates that the corresponding data system is inactive at that time. The inactive data systems may be represented using shading, e.g. 'Lab Server' as shown in FIG. 5. Additionally, there are provisions for the authorized user to register new data system by accessing 'Add' 530 option or delete any registered data system by accessing 'Remove' 532 option.

Figure 6:
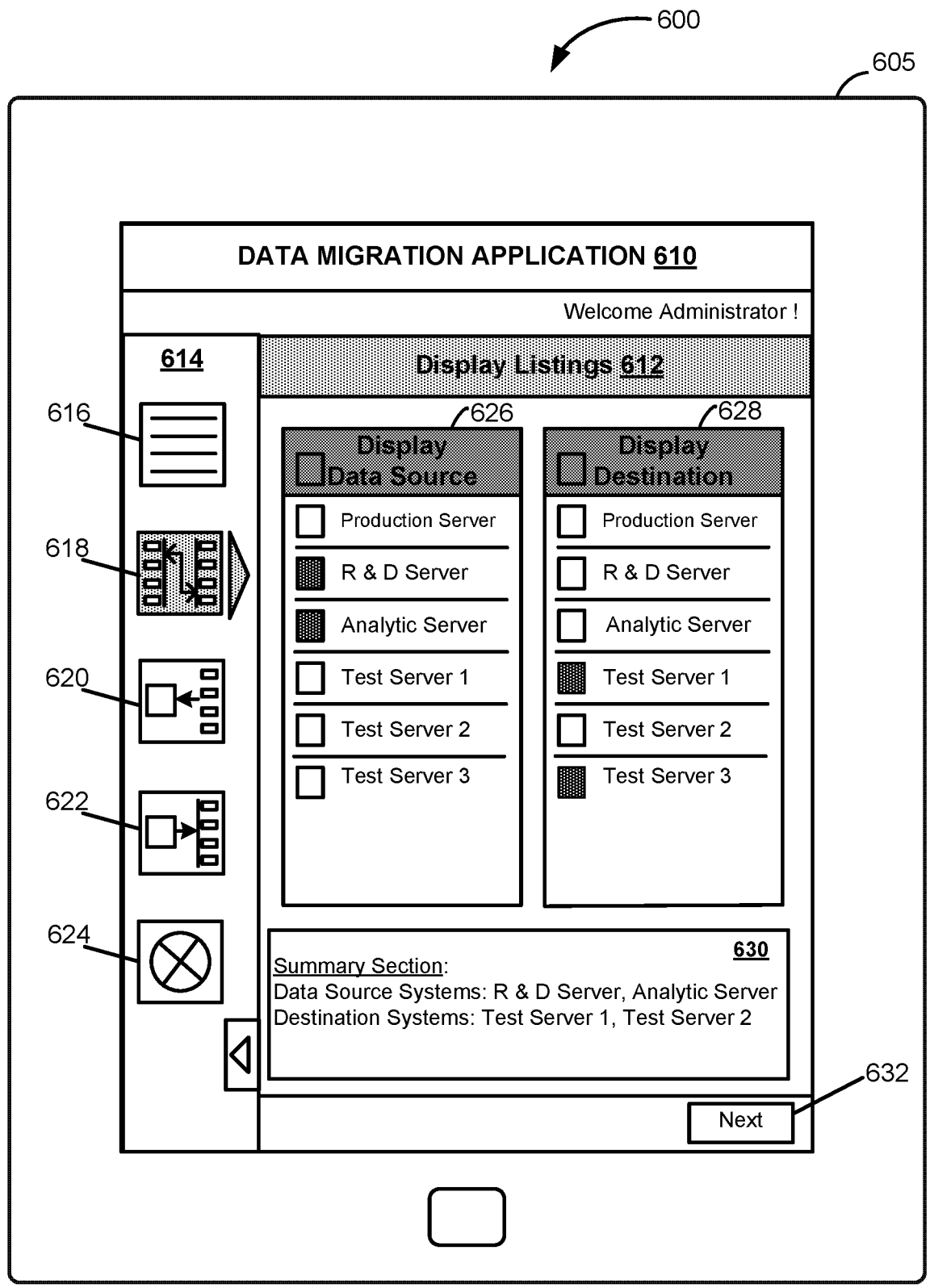
FIG. 6 illustrates an exemplary graphical user interface of a data migration application, according to an exemplary embodiment.

FIG. 6 illustrates an exemplary graphical user interface 600 of a data migration application 610, according to an exemplary embodiment. The data migration application 610 is installed in a computer device 605, for example, a tablet PC or a handheld device etc. The data migration application 610 displays left column 614 that includes functionality buttons such as data system listings button 616, data migration button 618, backup button 620, recovery button 622 and failed data migration button 624. In FIG. 6, the data migration button 616 is shaded to indicate user selection. When the data migration button 618 is selected, data systems registered with the data migration application 610 are presented under display listings 612 area. The display listings 612 may also list data systems under display data source 626 and display destination 628 separately. In an exemplary embodiment, data system registered as a data source system may also act as a destination system for other data source systems and vice versa. An authorized user having required permissions may select one or more data source systems, e.g. 'R & D Server' and 'Analytical Server' from the display data source 626 are shaded to indicate user selection. The authorized user may also select one or more destination system, e.g. 'Test Server 1' and 'Test Server 3' from the display destination 628 are shaded to indicate user selection. The user selection of data systems are assists the data migration application 610 to migrate data from selected data source systems to selected destination systems. The user selection of data systems is shown in a summary section 630. The authorized user may selection 'Next' option 632 displayed in the right hand corner below to confirm selection of the data source systems and destination systems for data migration.

Figure 7:
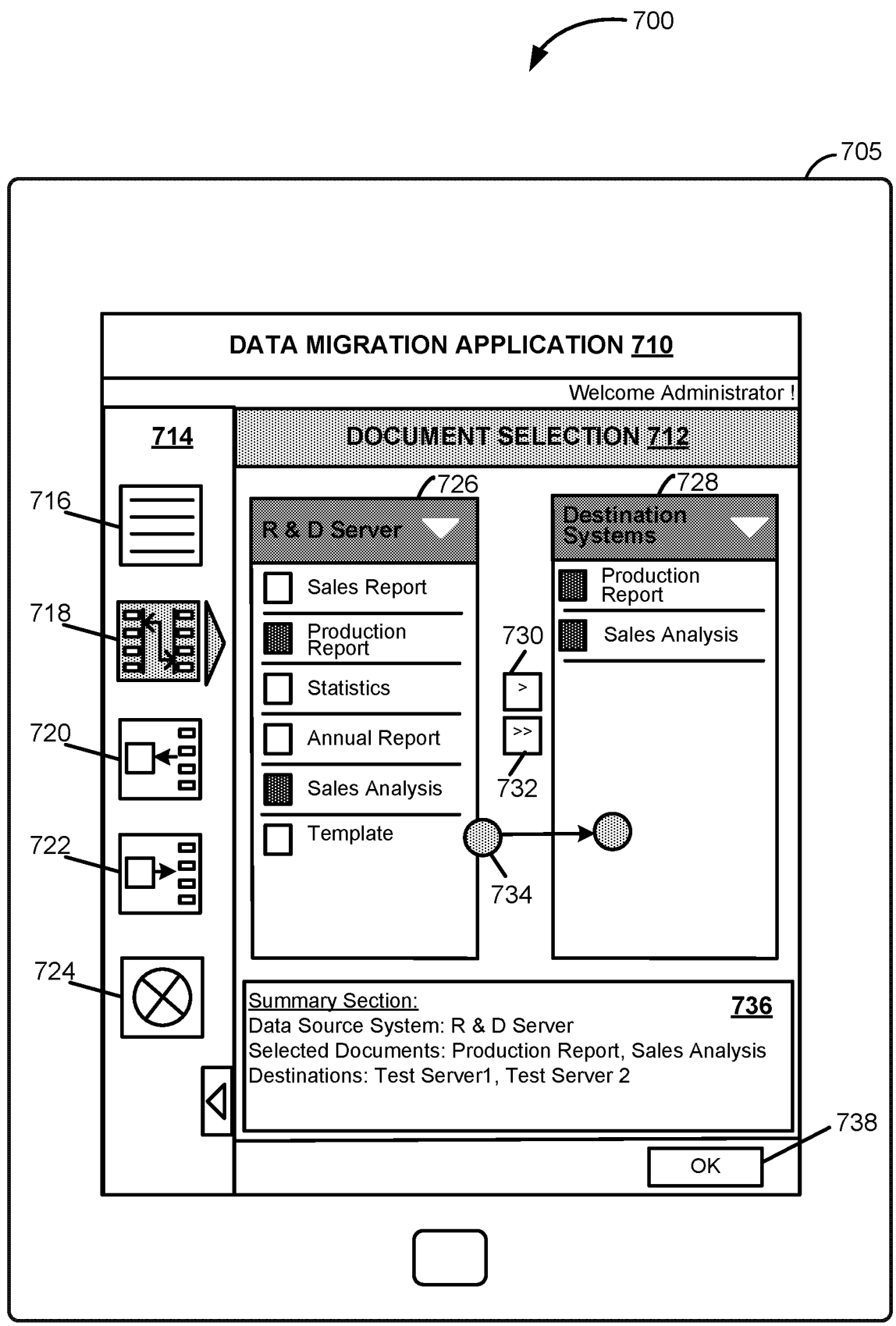
FIG. 7 illustrates an exemplary graphical user interface of a data migration application, according to an exemplary embodiment.

FIG. 7 illustrates a graphical user interface 700 of a data migration application 710, according to an exemplary embodiment. The data migration application 710 is installed in a computer device 705, for example, a tablet PC or a handheld device etc. The data migration application 710 displays left column 714 that includes functionality buttons such as data system listings button 716, data migration button 718, backup button 720, recovery button 722 and failed data migration button 724. In FIG. 7, the data migration button 718 is shaded to indicate user selection. Once the data source systems and destination systems are selected as described in FIG. 6, the data migration application 710 displays a document selection 712 area. The document selection 712 area may assist the authorized user to select documents to be migrated from a particular data source system 726, e.g. 'R & D Server'. The authorized user may select multiple data source systems from a drop down menu indicated by a drop down arrow as shown in FIG. 7. The authorized user may also select multiple destination systems 728 from a drop down menu indicated by the drop down arrow. In one exemplary example, the authorized user may select multiple documents from the 'R & D Server' and access command options (730 or 732) to indicate data migration, e.g. 'Production Report' and 'Sales Analysis'. The command options (730 and 732) may be a single key or double arrow key. In another embodiment, the authorized user may select documents from a selected data source system, e.g. 'R & D Server' 726, as shown in FIG. 7. The authorized user may select the documents from the 'R & D Server' and drag-n-drop 734 into the destination system 728. Additionally, a summary section 736 displays information corresponding to the selected documents, data source systems and destination systems. The authorized user may access an 'OK' option 738 displayed in the right hand corner below to confirm migration of the selected documents from the selected data source system, e.g. 'R & D Server' to the destination systems.

Figure 8:
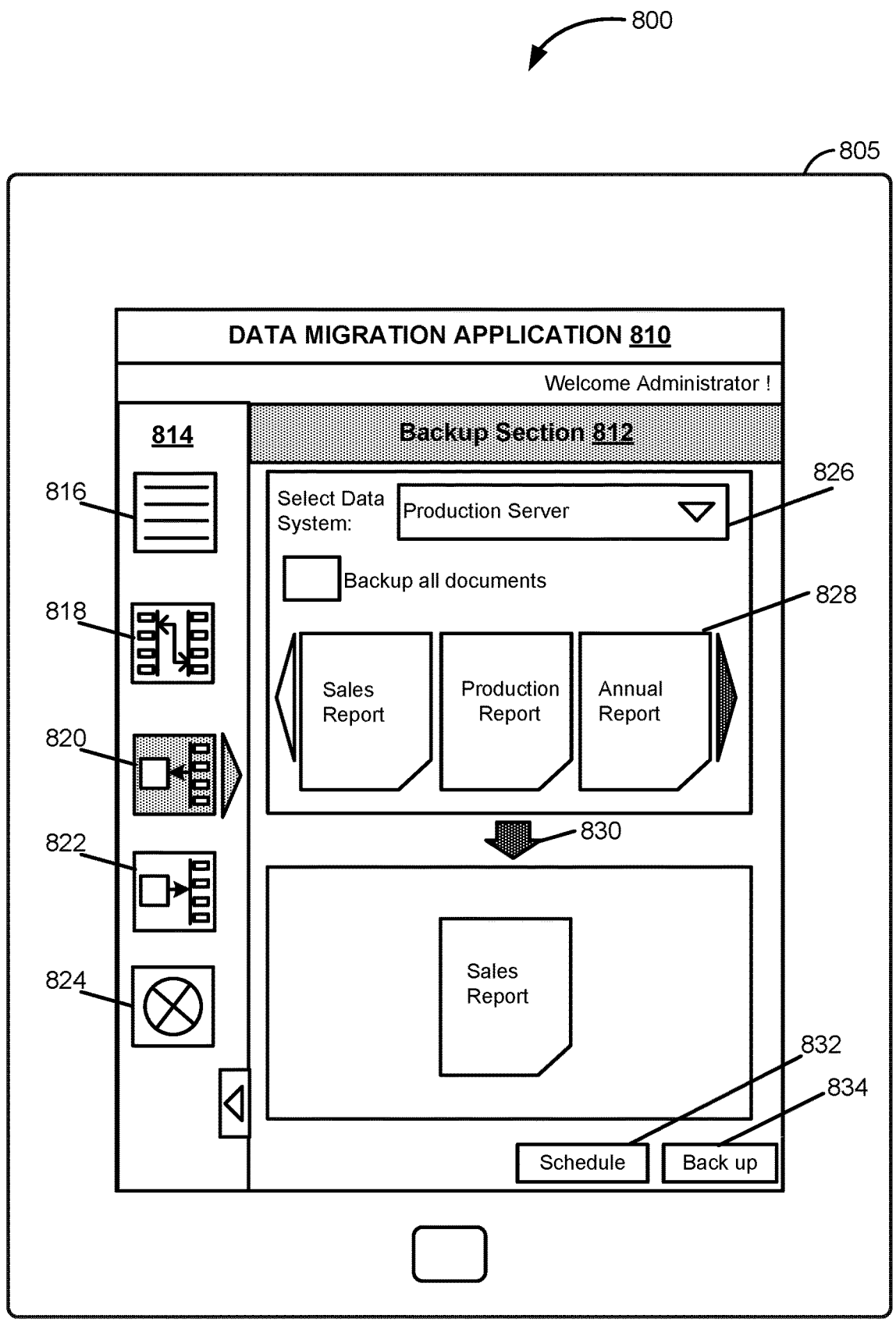
FIG. 8 illustrates an exemplary graphical user interface of a data migration application, according to an exemplary embodiment.

FIG. 8 illustrates a graphical user interface 800 of a data migration application 810, according to an exemplary embodiment. The data migration application 810 is installed in a computer device 805, for example, a tablet PC or a handheld device etc. The data migration application 810 displays left column 814 that includes functionality buttons such as data system listings button 816, data migration button 818, backup button 820, recovery button 822 and failed data migration button 824. In FIG. 8, the backup button 820 is shaded to indicate user selection. The displayed backup section 812 may receive user inputs from an authorized user to create backup of a selected data system. The authorized user may select data system 826, e.g. 'Production Server' from a drop down menu. Once a data system is selected from the drop down menu, corresponding documents 828, e.g. 'Sales Report', 'Production Report', and 'Annual Report' are displayed. The user may access left arrow and right arrow keys to scroll the documents horizontally, as shown in FIG. 8. The authorized user may create backup by selecting one or more documents or selecting 'Backup all documents' option displayed. Further, the authorized user may access the arrow key 830 to create backup of the selected document, e.g. 'Sales Report' from the selected data system, e.g. 'Production Server'. The authorized user may access 'Backup' option 834 displayed in the right hand corner below, to confirm document selection and also initiate the backup process. The authorized user may also access 'Schedule' option 832 displayed in the right hand corner below, to schedule backup of the selected documents periodically or non-regular time intervals.

Figure 9:
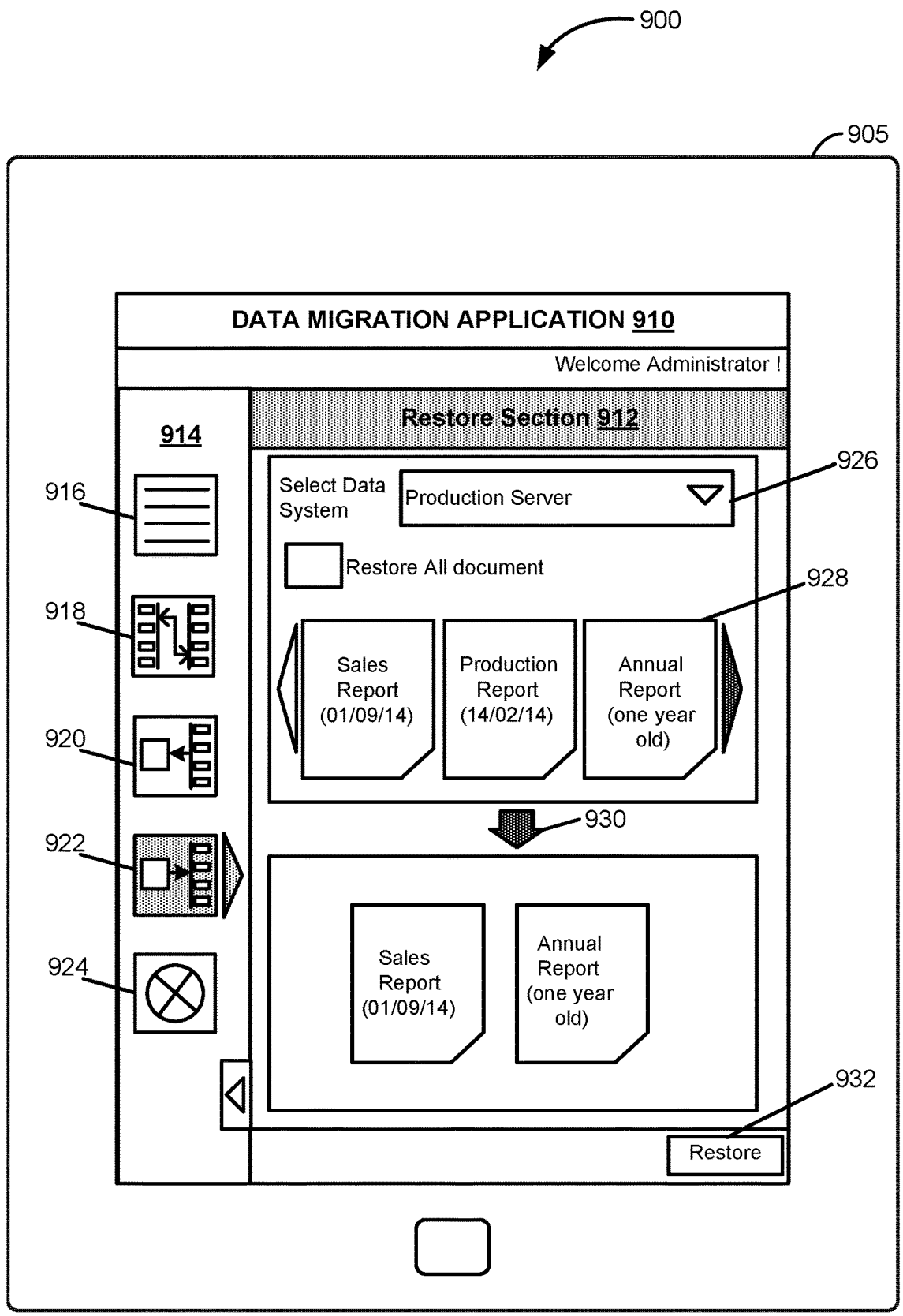
FIG. 9 illustrates an exemplary graphical user interface of a data migration application, according to an exemplary embodiment.

FIG. 9 illustrates a graphical user interface 900 of a data migration application 910, according to an exemplary embodiment. The data migration application 910 is installed in a computer device 905, for example, a tablet PC or a handheld device etc. The data migration application 910 displays left column 914 that includes functionality buttons such as data system listings button 916, data migration button 918, backup button 920, recovery button 922 and failed data migration button 924. In FIG. 9, the recovery button 920 is shaded to indicate user selection. The displayed restore section 912 may receive user inputs from an authorized user to restore selected documents into a selected data system. The authorized user may select data system 926, e.g. 'Production Server' from a drop down menu. Once a data system is selected from the drop down menu, corresponding documents 928, e.g. 'Sales Report', 'Production Report', and 'Annual Report' are displayed along with time stamps. The user may access left arrow and right arrow keys to scroll the documents horizontally, as shown in FIG. 8. The authorized user may create recover/restore by selecting one or more documents or selecting 'Restore all documents' option displayed, into the selected data system, e.g. 'Production Server'. Further, the authorized user may access the arrow key 930 to restore of the selected document, e.g. 'Sales Report' and 'Annual Report' with time stamps into the selected data system, e.g. 'Production Server'. The authorized user may access 'Restore' option 932 displayed in the right hand corner below, to confirm document selection and also initiate the restore/recover process.

Figure 10:
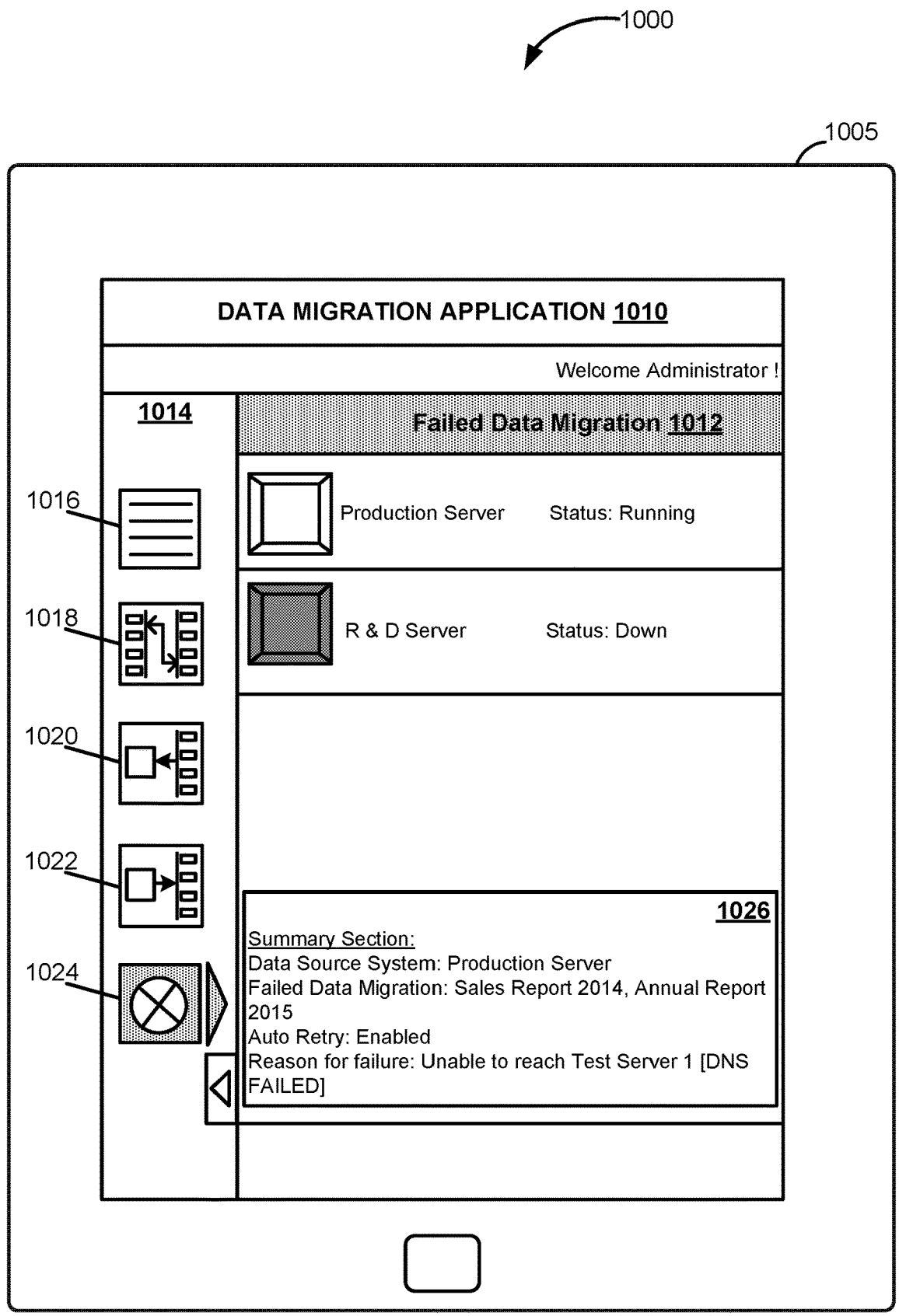
FIG. 10 illustrates an exemplary graphical user interface of a data migration application, according to an exemplary embodiment.

FIG. 10 illustrates an exemplary graphical user interface 1000 of a data migration application 1010, according to an exemplary embodiment. The data migration application 1010 is installed in a computer device 1005, for example, a tablet PC or a handheld device etc. The data migration application 1010 displays left column 1014 that includes functionality buttons such as data system listings button 1016, data migration button 1018, backup button 1020, recovery button 1022 and failed data migration button 1024. In FIG. 10, the failed data migration button 1020 is shaded to indicate user selection. The failed data migration section 1012 displays documents, e.g. 'Production Reports' that were not completely migrated from a data source system, e.g. 'Production Server' to a destination system, e.g. 'Test Server 2'. The data migration may be failed due to multiple issues, for examples, network failure, data system or server breakdown and etc. The failed data migration section 1012 also displays status of the data systems, e.g. 'Production Server' is 'running' and 'R & D Server' is 'down'. The data migration application 1010 continuously or periodically checks the data systems such as data source systems and destination systems, associated with a particular data migration process. Once the data systems associated with the particular data migration process are 'running', the data migration application 1010 automatically initiates the failed data migration. This is done by migrating the concerned documents from the data source system 'Production Server' to the destination system, e.g. 'Test Server 2'. This function is accomplished by an auto retry module of the data migration application 1010. Additionally, a summary section 1026 displays information corresponding to the failed data migration documents, associated data source systems and associated destination systems, auto retry enabled, issues that caused data migration failure and etc.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 11 is a block diagram of an exemplary computer system 1100 to maintain data integrity during data migration from one computer system to another computer system, according to one embodiment. The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage 810 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for maintaining data integrity during data migration from a plurality of data source systems to a plurality of destination systems connected via a distributed network, comprising:
    at a data source system from the plurality of data source systems, receiving a selection of a document to be migrated from the data source system to a destination system of the plurality of destination systems;
    determining, by at least one processor of a computer, a plurality of dependencies for the document, wherein the plurality of dependencies executes, after migration of the document, instructions associated with the document at the destination system, wherein the plurality of dependencies includes other documents from the plurality of data source systems, directly dependent data objects from the plurality of data source systems, and data objects related to the other documents, computer programs, and universes, and wherein the other documents include a document at a different data source system from the plurality of data source systems than the data source system associated with the document;
    generating, at the at least one processor of the computer, a dependency map based on the determined plurality of dependencies of the document, wherein the generated dependency map includes relationships of the determined plurality of dependencies with the document;
    initiating, at the at least one processor of the computer, data migration of the document and the generated dependency map from the data source system to the destination system, wherein the generated dependency map maintains integrity of the document during data migration; and
    based on the generated dependency map, fetching, at the at least one processor of the computer, instances of the determined plurality of dependencies of the document from corresponding data source systems of the plurality of data source systems.

2. A computer system for maintaining data integrity during data migration from a plurality of data source systems to a plurality of destination systems connected via a distributed network, the system comprising:
    a memory to store a program code;
    at least one processor communicatively coupled to the memory, the at least one processor configured to execute the program code to:
        at a data source system from the plurality of data source systems, receive a selection of a document to be migrated from the data source system to a destination system of the plurality of destination systems;
        determine a plurality of dependencies for the document, wherein the plurality of dependencies executes, after migration of the document, instructions associated with the document at the destination system, wherein the plurality of dependencies includes other documents from the plurality of data source systems, directly dependent data objects from the plurality of data source systems, and data objects related to the other documents, computer programs, and universes, and wherein the other documents include a document at a different data source system from the plurality of data source systems than the data source system associated with the document;
        generate, at the at least one processor of the computer, a dependency map based on the determined plurality of dependencies of the document, wherein the generated dependency map includes relationships of the determined plurality of dependencies with the document;
        initiate, at the at least one processor of the computer, data migration of the document and the generated dependency map from the data source system to the destination system, wherein the generated dependency map maintains integrity of the document during data migration; and
        based on the generated dependency map, fetch, at the at least one processor of the computer, instances of the determined plurality of dependencies of the document from corresponding data source systems of the plurality of data source systems.

3. A non-transitory computer readable storage medium to tangibly store instructions, which when executed by a computer, cause the computer to:
    at a data source system from the plurality of data source systems, receive a selection of a document to be migrated from the data source system to a destination system of the plurality of destination systems;
    determine a plurality of dependencies for the document, wherein the plurality of dependencies executes, after migration of the document, instructions associated with the document at the destination system, wherein the plurality of dependencies includes other documents from the plurality of data source systems, directly dependent data objects from the plurality of data source systems, and data objects related to the other documents, computer programs, and universes, and wherein the other documents include a document at a different data source system from the plurality of data source systems than the data source system associated with the document;

generate, at the at least one processor of the computer, a dependency map based on the determined plurality of dependencies of the document, wherein the generated dependency map includes relationships of the determined plurality of dependencies with the document;

initiate, at the at least one processor of the computer, data migration of the document and the generated dependency map from the data source system to the destination system, wherein the generated dependency map maintains integrity of the document during data migration; and based on the generated dependency map, fetch, at the at least one processor of the computer, instances of the determined plurality of dependencies of the document from corresponding data source systems of the plurality of data source systems.

4. The non-transitory computer readable medium according to claim 3, further comprising instructions which when executed by the computer further causes the computer to:

archive the document along with the generated dependency map into a database system connected to the distributed network;

determine status of the destination system; and upon determining that the status of the destination system is running, reinitiate data migration of the document from the data source system to the destination system by retrieving the archived document from the database system.

5. The computer implemented method according to claim 1, wherein determining dependencies of the document further includes determining, at the at least one processor of the computer, authorized users and users roles assigned to the document for data migration.

6. The computer implemented method according to claim 1, wherein the method comprises:

executing, at the at least one processor of the computer, query statements at the destination system to verify data integrity of the document from the data source system to the destination system during the data migration; and matching, at the at least one processor of the computer, an identification number of the document as migrated at the destination system with the selected document at the data source system.

7. The computer implemented method according to claim 1, wherein upon data migration failure of the selected document the method further comprises:

archiving, at the at least one processor of the computer, the document along with the generated dependency map into a database system connected to the distributed network;

determining, at the at least one processor of the computer, status of the destination system; and upon determining that the status of the destination system is running, reinitiating, at the at least one processor of the computer, data migration of the document from the data source system to the destination system by retrieving the archived document from the database system.

8. The computer implemented method according to claim 1, the method further comprising:

executing the instructions associated with the document at the destination system based on the plurality of dependencies at the dependency map of the document.

9. The computer system according to claim 2, wherein the at least one processor executes the program code to determine authorized users and users roles assigned to the document for data migration.

10. The computer system according to claim 2, wherein the at least one processor executes the program code to:

execute query statements at the destination system to verify data integrity of the document from the data source system to the destination system during the data migration; and match an identification number of the document as migrated at the destination system with the selected document at the data source system.

11. The computer system according to claim 2, wherein upon data migration failure of the selected document, the at least one processor executes the program code to:

archive the document along with the generated dependency map into a database system connected to the distributed network;

determine status of the destination system; and upon determining that the status of the destination system from the plurality of destination systems is running, reinitiate data migration of the document from the data source system to the destination system by retrieving the archived document from the database system.

12. The computer system according to claim 2, wherein the at least one processor executes the program code to:

execute the instructions associated with the document at the destination system based on the plurality of dependencies at the dependency map of the document.

13. The non-transitory computer readable medium according to claim 3, further comprising instructions which when executed by the computer further causes the computer to determine authorized users and users roles assigned to the document for data migration.

14. The non-transitory computer readable medium according to claim 3, further comprising instructions which when executed by the computer further causes the computer to:

execute query statements at the destination system to verify data integrity of the document from the data source system to the destination system during the data migration; and match an identification number of the document as migrated at the destination system with the selected document at the data source system.

15. The non-transitory computer readable medium according to claim 14, further comprising instructions which when executed by the computer further causes the computer to compare a file size of the document as migrated with a file size of the selected document at the data source system, if the identification number of the document as migrated successfully matches with the selected document.

16. The computer implemented method according to claim 6, further comprising:

upon successful matching of the identification number of the document as migrated at the destination system, comparing, at the at least one processor of the computer, a file size of the document as migrated with a file size of the selected document for migration at the data source system.

17. The computer system according to claim 10, wherein the at least one processor executes the program code to compare a file size of the document as migrated at the destination source system with a file size of the selected document at the data source system, if the identification number of the document as migrated successfully matches with the selected document.

* * * * *